United States Patent
Jeon et al.

(10) Patent No.: US 12,470,259 B2
(45) Date of Patent: Nov. 11, 2025

(54) ANTENNA FILTER AND ELECTRONIC DEVICE INCLUDING SAME IN WIRELESS COMMUNICATION SYSTEM

(71) Applicant: Samsung Electronics Co., Ltd., Suwon-si (KR)

(72) Inventors: Danbi Jeon, Suwon-si (KR); Bonmin Koo, Suwon-si (KR); Jonghwa Kim, Suwon-si (KR); Jihye Kim, Suwon-si (KR); Inho Na, Suwon-si (KR); Dongsik Shin, Suwon-si (KR); Seunghwan Yoon, Suwon-si (KR); Jongwook Zeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 345 days.

(21) Appl. No.: 18/154,433

(22) Filed: Jan. 13, 2023

(65) Prior Publication Data

US 2023/0155636 A1    May 18, 2023

Related U.S. Application Data

(63) Continuation of application No. PCT/KR2021/009595, filed on Jul. 23, 2021.

(30) Foreign Application Priority Data

Jul. 23, 2020   (KR) .................... 10-2020-0091974

(51) Int. Cl.
*H04B 7/0413* (2017.01)
*H01P 1/207* (2006.01)
(Continued)

(52) U.S. Cl.
CPC .......... *H04B 7/0413* (2013.01); *H01P 1/207* (2013.01); *H05K 1/0243* (2013.01); *H05K 1/115* (2013.01);
(Continued)

(58) Field of Classification Search
CPC ..... H04B 7/0413; H01P 1/207; H01P 1/2053; H01P 1/2056; H01P 5/184; H01P 1/2039;
(Continued)

(56) References Cited

U.S. PATENT DOCUMENTS 5,742,233 A    4/1998   Hoffman et al.
9,466,864 B2 * 10/2016   Rogozine .............. H04L 5/1461
(Continued)

FOREIGN PATENT DOCUMENTS

CN    107547123 A    1/2018
CN    109088181 A    12/2018
(Continued)

OTHER PUBLICATIONS

Extended European Search Report dated Dec. 1, 2023, issued in European Patent Application No. 21846413.9.
(Continued)

*Primary Examiner* — Juan A Torres
(74) *Attorney, Agent, or Firm* — Jefferson IP Law, LLP

(57) ABSTRACT

The disclosure relates to a $5^{th}$ generation (5G) or pre-5G communication system for supporting a higher data transfer rate than a $4^{th}$ generation (4G) communication system, such as long-term evolution (LTE). An antenna module is provided. The antenna module includes a filter for filtering a radio frequency (RF) signal, and a sub printed circuit board (PCB), the sub-PCB comprises a passive circuit for processing the RF signal, and, the sub-PCB may be coupled to the filter such that the filter operates as a bumper when being coupled to a filter board.

6 Claims, 15 Drawing Sheets

(51) Int. Cl.
    *H05K 1/02*    (2006.01)
    *H05K 1/11*    (2006.01)
(52) U.S. Cl.
    CPC ............... *H05K 2201/1006* (2013.01); *H05K 2201/10098* (2013.01)
(58) Field of Classification Search
    CPC ............... H05K 1/0243; H05K 1/115; H05K 2201/1006; H05K 2201/10098; H01Q 3/267; H01Q 21/0006; H01Q 21/28; H01Q 3/26
    USPC ........................................................ 455/73
    See application file for complete search history.

(56) References Cited

U.S. PATENT DOCUMENTS

| | | | |
|---|---|---|---|
| 9,979,062 | B2 | 5/2018 | Deriso |
| 10,056,922 | B1 | 8/2018 | Tsvelykh et al. |
| 10,440,584 | B1 | 10/2019 | Labadie et al. |
| 10,587,025 | B2 | 3/2020 | Brannon et al. |
| 11,081,769 | B2 * | 8/2021 | Vangala ............... H01P 1/213 |
| 11,088,731 | B2 | 8/2021 | Kim et al. |
| 2002/0105790 | A1 | 8/2002 | Naruse et al. |
| 2003/0169134 | A1 | 9/2003 | Ammar et al. |
| 2005/0170790 | A1 | 8/2005 | Chang et al. |
| 2018/0131059 | A1 | 5/2018 | Brannon et al. |
| 2021/0210828 | A1 * | 7/2021 | Hiratsuka ............... H01P 3/08 |
| 2021/0280954 | A1 | 9/2021 | Chun |
| 2023/0352831 | A1 * | 11/2023 | Sundararajan ......... H01Q 21/28 |

FOREIGN PATENT DOCUMENTS

| | | |
|---|---|---|
| CN | 109494489 A | 3/2019 |
| CN | 109560355 A | 4/2019 |
| CN | 109672011 A | 4/2019 |
| CN | 209329115 U | 8/2019 |
| CN | 110380164 A | 10/2019 |
| CN | 209709141 U | 11/2019 |
| CN | 210130003 U | 3/2020 |
| CN | 111180871 A | 5/2020 |
| CN | 111293387 A | 6/2020 |
| EP | 3 046 179 A1 | 7/2016 |
| JP | H0557904 U | 3/1993 |
| KR | 10-2001-0001955 A | 1/2001 |
| KR | 10-2017-0069609 A | 6/2017 |
| KR | 10-2018-0055770 A | 5/2018 |
| KR | 10-1855139 B1 | 5/2018 |
| KR | 10-2041514 B1 | 11/2019 |
| KR | 10-2055689 B1 | 12/2019 |
| KR | 10-2020-0062006 A | 6/2020 |
| KR | 10-2127506 B1 | 6/2020 |
| KR | 10-2204646 B1 | 1/2021 |
| WO | 2020/001270 A1 | 1/2020 |
| WO | 2020/093697 A1 | 5/2020 |

OTHER PUBLICATIONS

International Search Report dated Nov. 19, 2021, issued in International Application No. PCT/KR2021/009595.
Chinese Office Action dated Apr. 28, 2024, issued in Chinese Patent Application No. 202180060375.5.
Indian Office Action dated May 16, 2024, issued in Indian Patent Application No. 202317010743. 202180060375.5.
Chinese Office Action dated Sep. 24, 2024, issued in Chinese Patent Application No. 202180060375.5.
Korean Office Action dated Oct. 8, 2024, issued in Korean Patent Application No. 10-2020-0091974.
Chinese Office Action dated Dec. 4, 2024, issued in Chinese Patent Application No. 202180060375.5.
Chinese Office Action dated Jun. 23, 2025, issued in Chinese Patent Application No. 202180060375.5.
Chinese Notice of Allowance dated Sep. 8, 2025, issued in Chinese Patent Application No. 202180060375.5.
European Office Action dated Jun. 25, 2025, issued in European Patent Application No. 21846413.9.

* cited by examiner

ANTENNA FILTER AND ELECTRONIC DEVICE INCLUDING SAME IN WIRELESS COMMUNICATION SYSTEM

CROSS-REFERENCE TO RELATED APPLICATION(S)

This application is a continuation application, claiming priority under § 365 (c), of an International application No. PCT/KR2021/009595, filed on Jul. 23, 2021, which is based on and claims the benefit of a Korean patent application number 10-2020-0091974, filed on Jul. 23, 2020, in the Korean Intellectual Property Office, the disclosure of which is incorporated by reference herein in its entirety.

BACKGROUND

1. Field

The disclosure relates to a wireless communication system. More particularly, the disclosure relates to an antenna filter and an electronic device including the same in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" communication system or a "post long-term evolution (post LTE)" system.

The 5G communication system is considered to be implemented in sub-6G bands (i.e., FR1 corresponding to frequency range 1 of 3rd generation partnership project (3GPP) (e.g., 3.5 gigahertz (GHz) bands)) and ultrahigh frequency millimeter wave (mmWave) bands (i.e., FR2 corresponding to frequency range 2 of 3GPP (e.g., 28 GHz and 60 GHz bands))) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In order to improve communication performance, products equipped with multiple antennas are being developed, and it is expected that equipment with a much larger number of antennas will be used by utilizing massive MIMO technology. With an increase in the number of antenna elements in a communication device, the number of RF components (e.g., filters, or the like) inevitably increases accordingly.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for a filter module in a wireless communication system.

Another aspect of the disclosure is to provide a structure of a filter module including a printed circuit board (PCB) for cushioning between a filter board, on which multiple filters are disposed, and a radio frequency (RF) filter in a wireless communication system.

Another aspect of the disclosure is to provide a device in which a passive circuit is implemented on a PCB for cushioning between a filter board and a radio frequency (RF) filter in a wireless communication system, and a method for implementing the same.

Additional aspects will be set forth in part in the description which follows and, in part, will be apparent from the description, or may be learned by practice of the presented embodiments.

In accordance with an aspect of the disclosure, an antenna filter module is provided. The antenna filter module includes a filter configured to filter a radio frequency (RF) signal, and a sub-printed circuit board (PCB), wherein the sub-PCB includes a passive circuit configured to process the RF signal, and wherein the sub-PCB is coupled to the filter so as to operate as a bumper when the filter is coupled to a filter board.

In accordance with another aspect of the disclosure, a multiple-input multiple-output (massive MIMO) unit (MMU) device in a wireless communication system is provided. The MMU device includes at least one processor configured to process a signal, multiple radio frequency (RF) filter modules configured to filter a signal, and an antenna array configured to radiate a signal, wherein an RF filter module among the multiple RF filter modules includes a filter configured to filter an RF signal and a sub-printed circuit board (PCB) coupled to the filter, wherein the sub-PCB includes a passive circuit configured to process the RF signal, and wherein the sub-PCB is coupled to the filter so as to operate as a bumper when the filter is coupled to a filter board.

The device and the method according to various embodiments of the disclosure may reduce the area of a filter board while preventing a crack due to coupling through a filter module including a radio frequency (RF) filter and a PCB for cushioning between the filter board and the RF filter.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
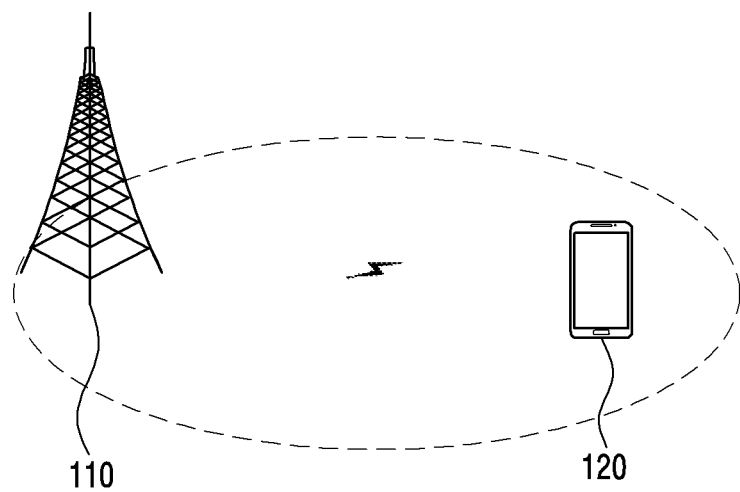
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

As used in the following description, terms (e.g., substrate, plate, print circuit board (PCB), flexible PCB (FPCB), module, antenna, antenna element, circuit, processor, chip, element, and device) referring to components of an electronic device, terms referring to the shape of a component (e.g., tuning member, tuning structure, tuning structure body, structure, support unit, contact unit, protrusion, opening), terms referring to the connection unit between structures (e.g., connection unit, contact unit, support unit, contact structure, conductive member, and assembly), and terms referring to a circuit (e.g., transmission line, PCB, FPCB, signal line, feeding line, data line, RF signal line, antenna line, RF path, RF module, and RF circuit) are exemplified for convenience of description. Accordingly, the disclosure is not limited to the terms described below, and other terms having equivalent technical meanings may be used. In addition, the term, such as " . . . unit", " . . . device", " . . . material", or " . . . body" used below may imply at least one shape structure or a unit for processing a function.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

Furthermore, in the disclosure, various embodiments will be described using terms employed in some communication standards (e.g., $3^{rd}$ generation partnership project (3GPP) and institute of electrical and electronics engineering (IEEE)), but they are only for the sake of illustration. The embodiments of the disclosure may also be easily applied to other communication systems through modifications.

Hereinafter, the disclosure relates to an antenna filter and an electronic device including the same in a wireless communication system. Specifically, the disclosure describes a technology for achieving miniaturization of a filter board by implementing a passive circuit on a PCB that functions as a cushion between a filter board and an RF filter in a wireless communication system. According to an embodiment of the disclosure, the filter board may include a PCB for an antenna filter unit (AFU). According to an embodiment of the disclosure, the filter board may include a PCB for calibration of beamforming.

FIG. 1A illustrates a wireless communication system according to an embodiment of the disclosure.

Referring to FIG. 1A, in a wireless communication environment of FIG. 1A, a base station 110 and a terminal 120 are illustrated as some of nodes using a wireless channel.

The base station 110 is a network infrastructure that provides wireless access to the terminal 120. The base station 110 has coverage defined as a predetermined geographic area based on a distance to which a signal can be transmitted. The base station 110 may be referred to as, in addition to a base station, a "multiple input multiple output (massive MIMO) unit (MMU)", an "access point (AP)", an "eNodeB (eNB)", and a "$5^{th}$ generation node (5G node)", "5G NodeB (NB)", a "wireless point", a "transmission/reception point (TRP)", an "access unit", a "distributed unit (DU)", a "transmission/reception point (TRP)", a "radio unit (RU)", a "remote radio head (RRH)", or other terms having equivalent technical meaning. The base station 110 may transmit a downlink signal or may receive an uplink signal.

The terminal 120 is a device used by a user, and communicates with the base station 110 through a wireless channel. In some cases, the terminal 120 may be operated without user intervention. For example, the terminal 120 is a device for performing machine type communication (MTC) and may not be carried by the user. The terminal 120 may be referred to as, in addition to a terminal, a "user equipment (UE)", a "mobile station", a "subscriber station", a "customer premises equipment (CPE)", a "remote terminal", a "wireless terminal", an "electronic device", a "vehicle terminal", a "user device", or other terms having an equivalent technical meaning.

Figure 1B:
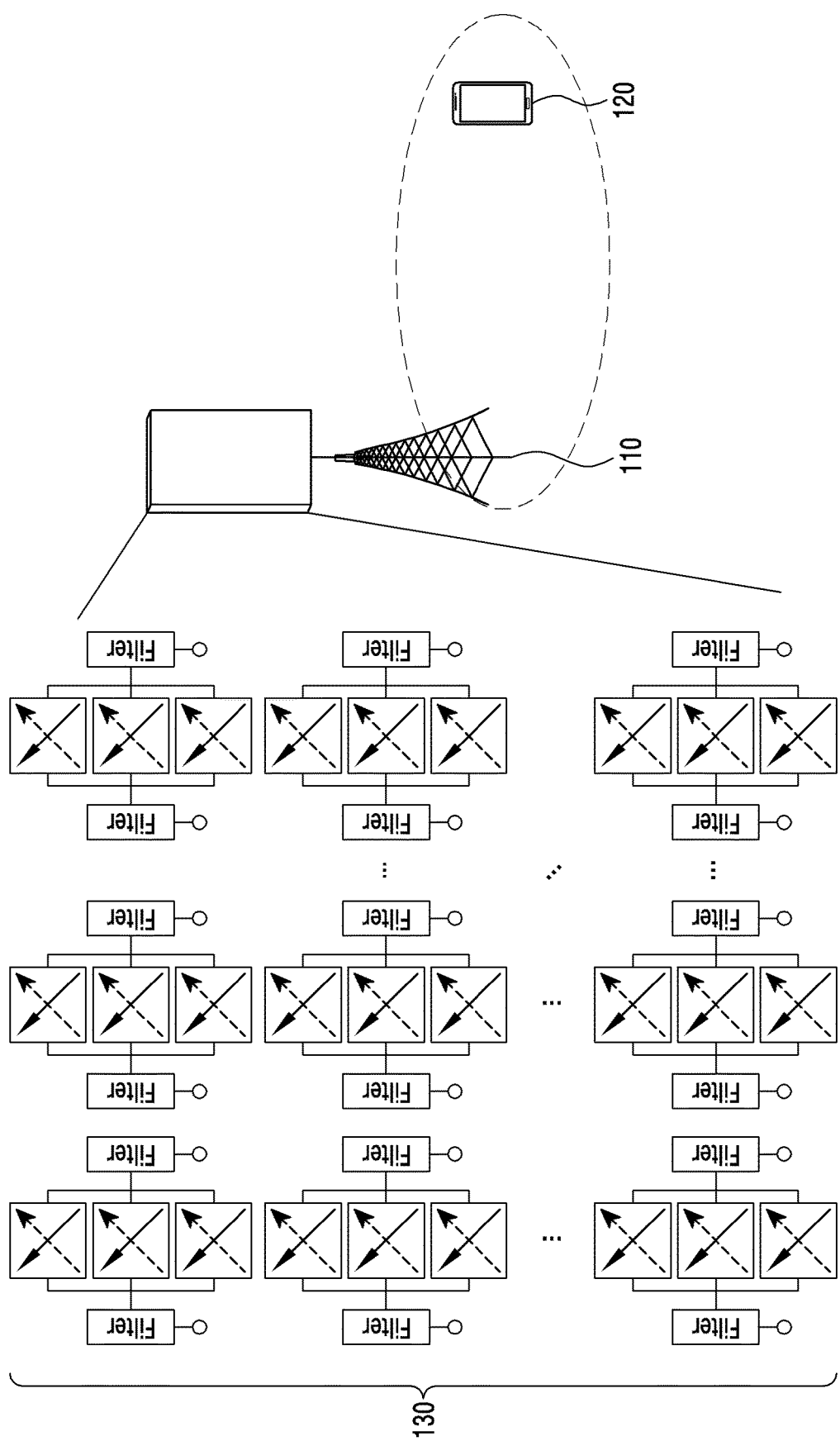
FIG. 1B illustrates an antenna array in a wireless communication system according to an embodiment of the disclosure.

FIG. 1B illustrates an antenna array in a wireless communication system according to an embodiment of the disclosure.

Referring to FIG. 1B, beamforming is being used as one of techniques for mitigating propagation path loss and increasing the propagation distance of radio waves. Beamforming, in general, uses multiple antennas to concentrate the arrival area of radio waves or to increase the directivity of reception sensitivity for a specific direction. Therefore, in order to form a beamforming coverage instead of forming a signal in an isotropic pattern by using a single antenna, the base station 110 may have multiple antennas. Hereinafter, an antenna array including multiple antennas is described. The antenna array illustrated in FIG. 1B is merely an example for describing embodiments of the disclosure, and is not construed as limiting other embodiments of the disclosure.

Referring to FIG. 1B, the base station 110 may include an antenna array 130. According to an embodiment of the disclosure, the base station 110 may include a massive MIMO unit (MMU) including the antenna array 130. Each antenna included in the antenna array 130 may be referred to as an array element or an antenna element. In FIG. 1B, the antenna array 130 is illustrated as a two-dimensional planar array, but this is only an example and does not limit other embodiments of the disclosure. According to another embodiment of the disclosure, the antenna array 130 may be configured in various forms, such as a linear array. The antenna array may be referred to as a massive antenna array.

In order to improve communication performance, the number of antennas (or antenna elements) of equipment (e.g., the base station 110) for performing wireless communication is increasing. In addition, the number of RF components (e.g., amplifiers or filters) and components for processing RF signals received or transmitted through the antenna element increases, and thus spatial gain and cost efficiency as well as satisfaction of communication performance are essential for configuring a communication device. When the number of paths increases, the number of filters for processing a signal in each antenna element also increases.

An RF filter may include a circuit that performs filtering to transmit a radio signal of a desired frequency by forming resonance. For example, the RF filter may perform a function for selectively identifying a frequency. The RF filter is an important component for selecting and attenuating a frequency, and is used in most communication devices. Since an RF filter is included in each path, the weight and size of the RF filter are closely related to product competitiveness.

Since the performance of a metal cavity filter is excellent in terms of power handling and capacity/insertion loss/attenuation performance, the metal cavity filter is being used in a number of communication devices. However, the metal cavity filter is not easy to mass-produce due to a cost limit, a product size, and the like for satisfying performance.

According to various embodiments of the disclosure, a ceramic waveguide filter (hereinafter, a ceramic filter) may be used as the RF filter. Cavities may be implemented with ceramic and plating, and a resonator is disposed in each cavity. The overall size of a filter may be reduced by reducing the size of each cavity. Compared to the existing metal cavity filter, the weight and volume may be reduced, and thus the size of the MMU may be reduced (approximately 8%).

The ceramic waveguide filter may be disposed on a plate (hereinafter, a filter board) on which one or more filters may be disposed. When the ceramic waveguide filter and the filter board are disposed using surface-mounted technology (SMT), RF characteristics (e.g., return loss) and a phase may be changed. Due to the above-mentioned change in RF characteristics, in general, a separate tuning procedure (e.g., a tuning process by a matching circuit) is additionally required in order to ensure the RF characteristics to the ceramic waveguide filter. Accordingly, various embodiments of the disclosure provide a method for minimizing the tuning procedure.

The ceramic waveguide filter transmits a signal through a dielectric instead of air. Since the inside of the ceramic waveguide filter is filled with a dielectric, the ceramic waveguide filter may be miniaturized in inverse proportion to permittivity. Due to the use of the dielectric, a harmonic resonance frequency having an influence may be lowered. The harmonic resonance frequency implies a frequency component that is a multiple of a resonance frequency. For example, in the case of a metal cavity filter, a harmonic frequency is generally generated at 3 to 3.5 times, but the harmonic resonance frequency may be adjusted to 13 to 14 GHz by using various shapes of the filter. However, in the case of a ceramic waveguide filter, a harmonic component is generally generated at about 2 to 2.5 times. When the harmonic resonance frequency for the ceramic waveguide filter is formed within a predetermined range, a low pass filter is additionally required to satisfy a requirement (e.g., under 12.75 GHz, −25 dB is required according to 3GPP standard). Various embodiments of the disclosure provide a method for designing an efficient antenna device through deployment of a passive circuit, such as a low-pass filter in a communication device.

Figure 2:
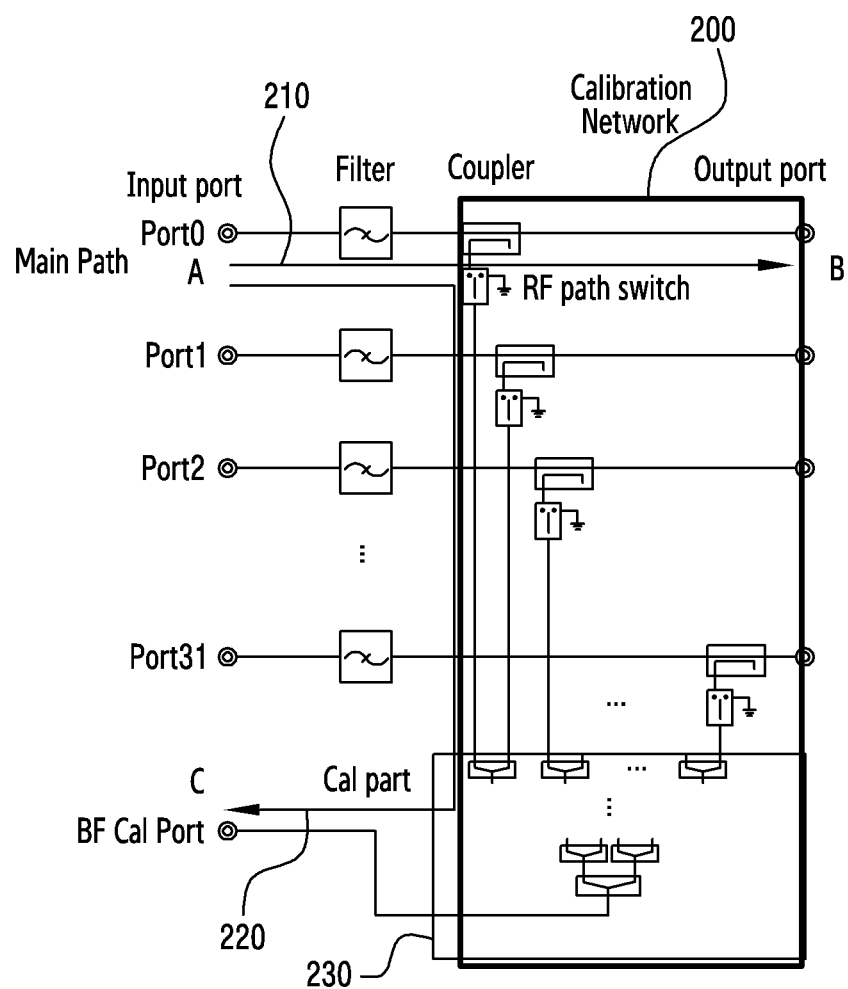
FIG. 2 illustrates a circuit of a calibration network PCB for beamforming according to an embodiment of the disclosure.

FIG. 2 illustrates a circuit of a calibration network PCB for beamforming according to an embodiment of the disclosure.

Referring to FIG. 2, multiple antennas are used to implement beamforming. Through the multiple antennas, a beamforming gain may be increased, and multiple input multiple output (MIMO) technology may be utilized. Two or more antennas are used at both or one of the transmission and reception ends, a communication device may obtain effects, such as reduced fading effect, large capacity, high speed, and increased coverage. In addition, channel capacity may be increased without increasing a frequency bandwidth and transmission power. In order to achieve the above-mentioned effects, the communication device may include a calibration network circuit. According to an embodiment of the disclosure, the calibration network circuit may be used for phase control for each antenna.

Referring to FIG. 2, an example of a calibration network 200 connected to an antenna is described. In order to provide beamforming in the antenna, amplitude and phase in each transmission (TX) path and each reception (RX) path need to be kept constant. However, since each transmission path or each reception path has a deviation in an actual wireless module, it is required to compensate for the deviation.

Compensating for such a deviation may be referred to as beamforming calibration. According to an embodiment of the disclosure, a BF calibration network including a combiner 230 and a coupler capable of determining the characteristics of each path is separately required. The RF amplitude and phase are continuously monitored through the calibration network 200, and changes in the characteristics of the calibration network should be minimized even when the environment changes. According to an embodiment of the disclosure, the calibration network 200 may include 32 transmission paths and 32 reception paths.

There may be input/output ports according to each transmission path or each reception path. Each path from the input port to the output port may be referred to as a main path 210. The calibration network 200 may include a path 220 for feeding back a transmission signal for each transmission path, acquired through a bidirectional coupler coupled to an output end of each transmission path, to a calibration processor. For calibration of a transmission path, the calibration processor may measure an RF characteristic (phase/amplitude/delay, or the like) deviation between each of transmission paths, and may perform TX calibration for compensating for the measured deviation. The TX calibration for compensating for the measured deviation may be performed based on a correlation operation between a feedback signal, captured at the rear end of a transmission path using a magnetic transmission signal, and a transmitted signal. For calibration of a reception path, the calibration processor may measure an RF characteristic (phase/amplitude/delay, or the like) deviation between each of receptions paths, and may perform RX calibration for compensating for the measured deviation. By inserting a pilot signal into each reception path, the RX calibration for compensating for the measured deviation may be performed based on a correlation operation between the pilot signal and a signal output from the rear end of the reception path.

Although an example of a calibration network has been described with reference to FIG. 2, the structure of the calibration network 200 illustrated in FIG. 2 is only an example, and embodiments of the disclosure are not limited to a specific structure or a specific arrangement. In addition, the calibration network is only an example as a circuit that performs a function for controlling the characteristics of a beamforming device, and hereinafter, it goes without saying that the calibration network described in embodiments of the disclosure may be replaced with a passive element and other circuits that play a similar role.

As described above, since multiple RF paths are provided for beamforming, a calibration network for controlling RF characteristics is essential for a beamforming device. Hereinafter, various embodiments of the disclosure provide a method for designing an efficient beamforming device through arrangement between RF components of a calibration network or between the related RF components and a filter.

Figure 3:
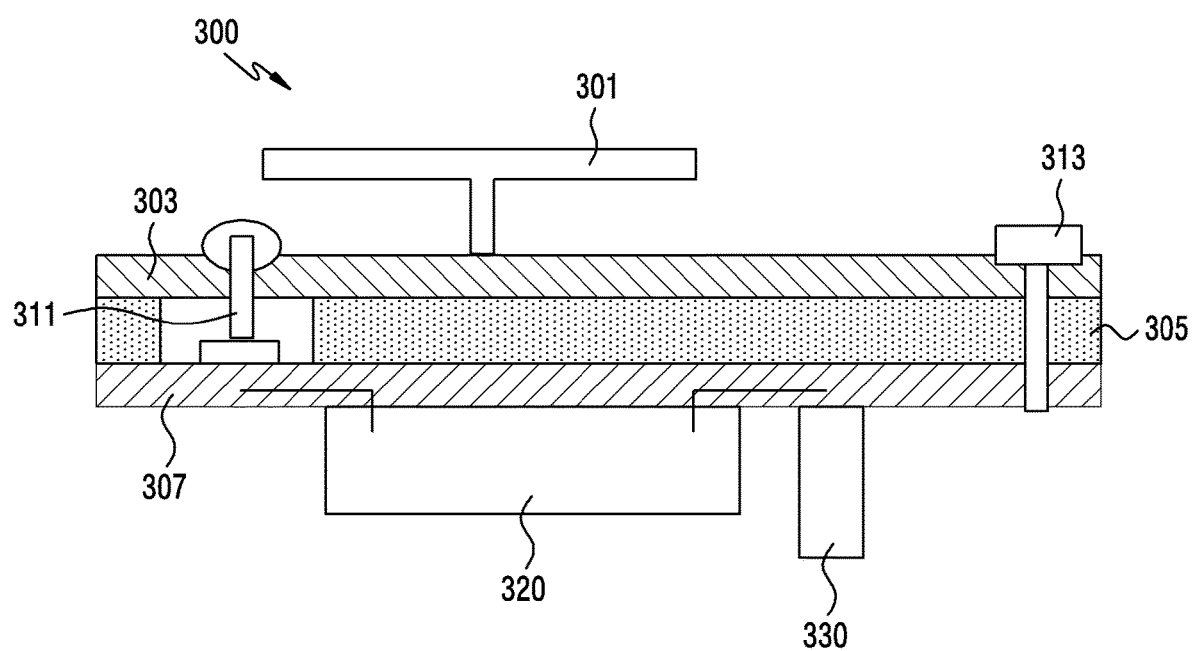
FIG. 3 illustrates a structure of an antenna module according to an embodiment of the disclosure.

FIG. 3 illustrates a structure of an antenna module according to an embodiment of the disclosure.

Referring to FIG. 3, an antenna module 300 may refer to a module including circuits for radiating an input RF signal into the air through an antenna element. According to an embodiment of the disclosure, the antenna module 300 may be referred to as an antenna filter unit.

Referring to FIG. 3, the antenna module 300 may include an antenna element 301. Although the structure thereof according to one antenna element has been exemplarily described in FIG. 3, the antenna module 300 may include multiple antenna elements. Each antenna element may be disposed on an antenna PCB 303. The antenna PCB 303, a metal plate 305, and a calibration network PCB 307 may be sequentially stacked and disposed. According to an embodiment of the disclosure, the calibration network PCB 307 may include a circuit (e.g., the calibration network 200) for compensating for deviation of each RF path. The metal plate 305 may be disposed between the antenna PCB 303 and the calibration network PCB 307 to prevent the antenna PCB 303 or the calibration network PCB 307 from being bent due to external or internal factors.

The antenna module 300 may include a connection unit 311 for electrical connecting between the antenna PCB 303 and the calibration network PCB 307. Although FIG. 3 illustrates a pin-type connection unit, it goes without saying that the connection unit may be replaced with an element for performing an identical or similar function. In addition, a rivet 313 may be disposed through three layers for connection of the antenna PCB 303, the metal plate 305, and the calibration network PCB 307.

A filter 320 and a power amplifier 330 for each RF path may be disposed on the calibration network PCB 307. According to an embodiment of the disclosure, the filter 320 may be mounted on the calibration network PCB 307 by using surface-mounted technology (SMT). However, there is a risk of cracking due to the large area and heterogeneous nature.

Hereinafter, in the disclosure, a method for disposing a relatively small PCB between a filter and a filter board to prevent cracks is described. Hereinafter, for convenience of description, the PCB disposed to prevent cracks may be referred to as a sub-PCB or a bumper PCB, but may be replaced with various terms indicating an identical or similar function, such as a combined PCB, a cushion PCB, and an overlapping PCB.

According to an embodiment of the disclosure, the sub-PCB functioning as a bumper may include an element (hereinafter, an RF component) for processing an RF signal. With the increasing number of antenna elements, the number of RF components for processing each antenna element also increases. Mounting RF components on one surface of the filter board increases the PCB area while increasing the distance between the components. When transmitting a signal, if the length of a transmission line increases, impedance increases, and the increased impedance affects return loss. Therefore, the more RF components are disposed in one filter board, the greater the loss. Accordingly, an RF component is included in a sub-PCB of a filter module according to various embodiments of the disclosure so that the RF component may be close to other signal processing elements (e.g., an antenna element, a filter, a feeding line, an RF processing circuits, or the like). When the area of the filter board is reduced and the signal processing loss of RF components in an antenna module is reduced, performance degradation (e.g., a change in characteristic impedance, or insertion loss due to power feeding) may be minimized. Accordingly, according to various embodiments of the disclosure, the sub-PCB may not only provide a bumper function, but may also minimize loss degradation through circuit arrangement, thereby increasing processing efficiency. Hereinafter, as an example of the RF component, a harmonic elimination circuit (e.g., a low-pass filter (LPF)), a coupler, or a connector is presented, but embodiments of the disclosure are not limited thereto. Any element included in an RF signal processing path to the antenna element may be included in the sub-PCB of the disclosure.

Figure 4:
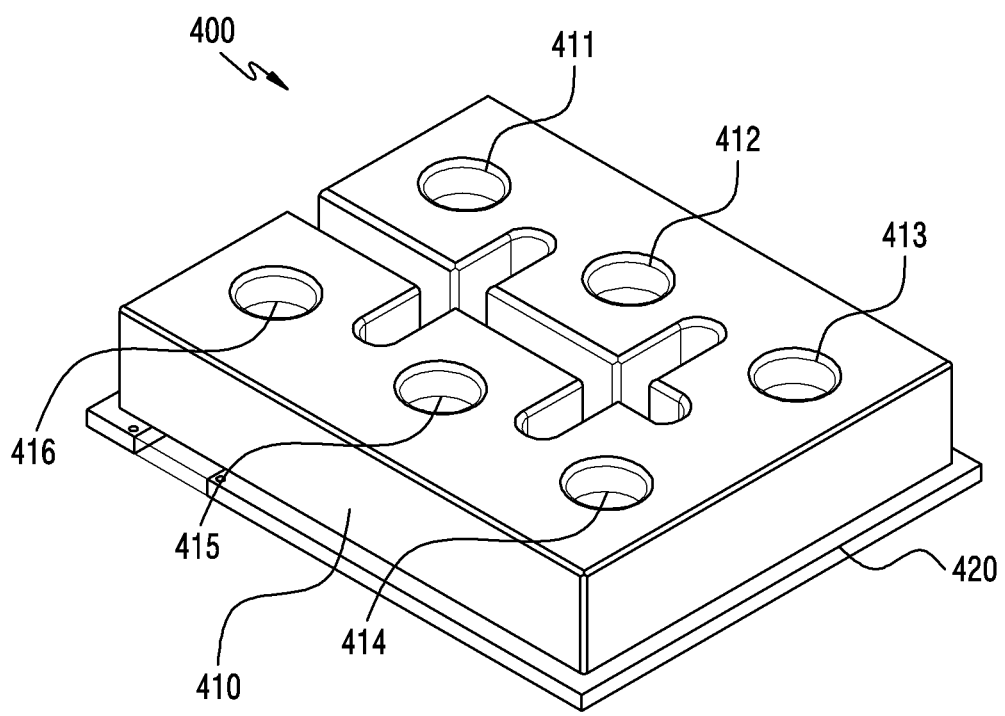
FIG. 4 illustrates a filter module according to an embodiment of the disclosure.

FIG. 4 illustrates a filter module according to an embodiment of the disclosure.

Referring to FIG. 4, a filter module 400 may imply a structure in which an RF filter 410 is coupled to a bumper PCB 420.

Referring to FIG. 4, the filter module 400 may include the RF filter 410. The RF filter 410 may include multiple resonator areas. For example, one filter block of the RF filter 410 may include six resonator areas. The resonator areas may include a first resonator area 411, a second resonator area 412, a third resonator area 413, a fourth resonator area 414, a fifth resonator area 415, and a sixth resonator area 416. Each resonator area may correspond to a cavity formed in the filter block. According to an embodiment of the disclosure, the RF filter 410 may be a ceramic waveguide filter. The filter block may be made of a ceramic material. A dielectric may be included in the filter block. In addition, according to an embodiment of the disclosure, a conductive metal layer may be formed on the surface of the filter block. The conductive metal layer may be partially removed for a specific function. For example, the conductive metal layer may be partially removed from an input/output resonator area for plating and circuit disconnection around the boundary surface of an input/output groove, and the conductive metal layer of a specific portion may be removed for tuning a frequency and a coupling amount.

The filter module 400 may include the bumper PCB 420. Hereinafter, various embodiments of the disclosure propose a filter module in which a passive circuit is inserted into a bumper PCB in order to reduce the size of a filter board. When a filter included in the filter module is a ceramic filter, the filter module may be referred to as a ceramic waveguide filter module structure. As described above, cracking may occur due to a difference in coefficient of terminal expansion (CTE) between a filter (e.g., the filter 320 in FIG. 3) and a filter board (e.g., the calibration network PCB 307 in FIG. 3). The bumper PCB 420 may be used to prevent the crack.

According to various embodiments of the disclosure, at least one passive circuit may be included in the bumper PCB. According to an embodiment of the disclosure, the at least one passive circuit may include an LPF. According to an embodiment of the disclosure, the at least one passive circuit may include a coupler. According to an embodiment of the disclosure, the at least one passive circuit may include a connector. For example, a bumper PCB may be configured integrally with a pin. This integrated structure may be referred to as a ceramic filter module. The multi-layer structure of the bumper PCB according to each passive circuit is described with reference to FIGS. 5A, 5B, 5C, and 5D.

In the disclosure, in relation to the type of filter, a ceramic waveguide filter is described as an example, but embodiments of the disclosure are not limited thereto. Even if a filter is not a ceramic filter, any structure in which a PCB is added to the filter (e.g., a miniaturized filter in which a medium is used in a resonator) in order to prevent cracks may be understood as the disclosure. When a medium is used in the resonator, the size of the resonator is reduced and the intensity per unit volume is increased due to a dielectric. When compared with the case of a resonator filled with only air without using a medium, the overall size of the filter is reduced due to the resonator filled with a medium, and thus SMT is possible. Unlike a metal filter, it is difficult for a ceramic filter to be physically fastened (e.g., screw-fastened) to a counterpart, and thus SMT coupling is required. However, cracking is easy to occur due to the difference in CTE. Accordingly, a bumper PCB, which is significantly smaller in size than a filter board (or a calibration PCB), is used to prevent a crack. For example, a bumper PCB is used to prevent a crack, and a passive circuit used in a filter board is implemented in the bumper PCB, whereby the area of the filter board may be reduced. Hereinafter, an example of the passive circuit implemented in the bumper PCB is illustrated through FIGS. 5A, 5B, 5C, and 5D.

FIGS. 5A, 5B, 5C, and 5D illustrate a passive circuit disposed on a bumper PCB of a filter module according to various embodiments of the disclosure. Here, the bumper PCB 420 in FIG. 4 is illustrated as the bumper PCB.

Figure 5A:
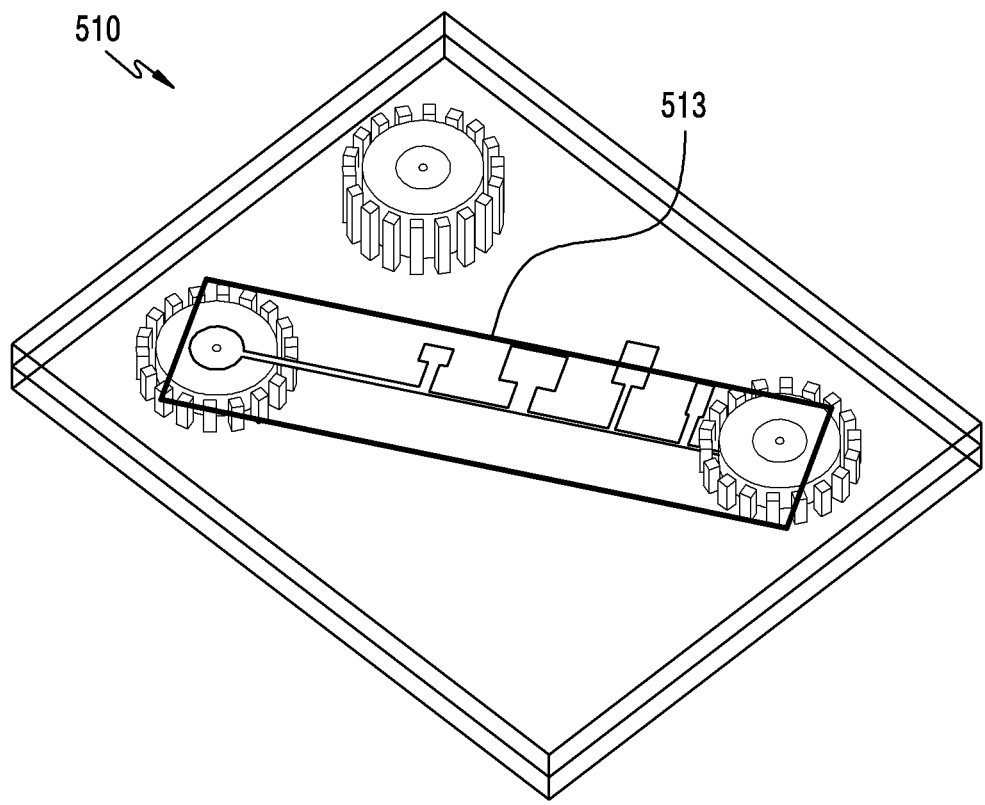
FIGS. 5A, 5B, 5C, and 5D illustrate a passive circuit disposed on a bumper PCB of a filter module according to various embodiments of the disclosure.

Referring to FIG. 5A, according to an embodiment of the disclosure, an LPF 513 may be disposed on a bumper PCB 510. The LPF 513 may include a passive circuit. For example, the LPF 513 may include an inductor and a capacitor. The LPF 513 may be disposed on the bumper PCB 510 in order to remove a harmonic component caused within a predetermined range due to the high permittivity of a ceramic waveguide filter.

The LPF is arranged not on a filter board for arranging multiple filters but on one layer of a bumper PCB for functioning as a cushion between the filter board and the RF filters, and thus the area of the filter board may be reduced. According to an embodiment of the disclosure, the filter board may include the calibration network PCB 307 in FIG. 3. According to one embodiment of the disclosure, the filter board may include an AFU PCB. In addition, according to an embodiment of the disclosure, the filter board may include an amplifier (AMP) board. This is because the bumper PCB of the filter module of the disclosure may also be attached to the AMP board.

Figure 5B:
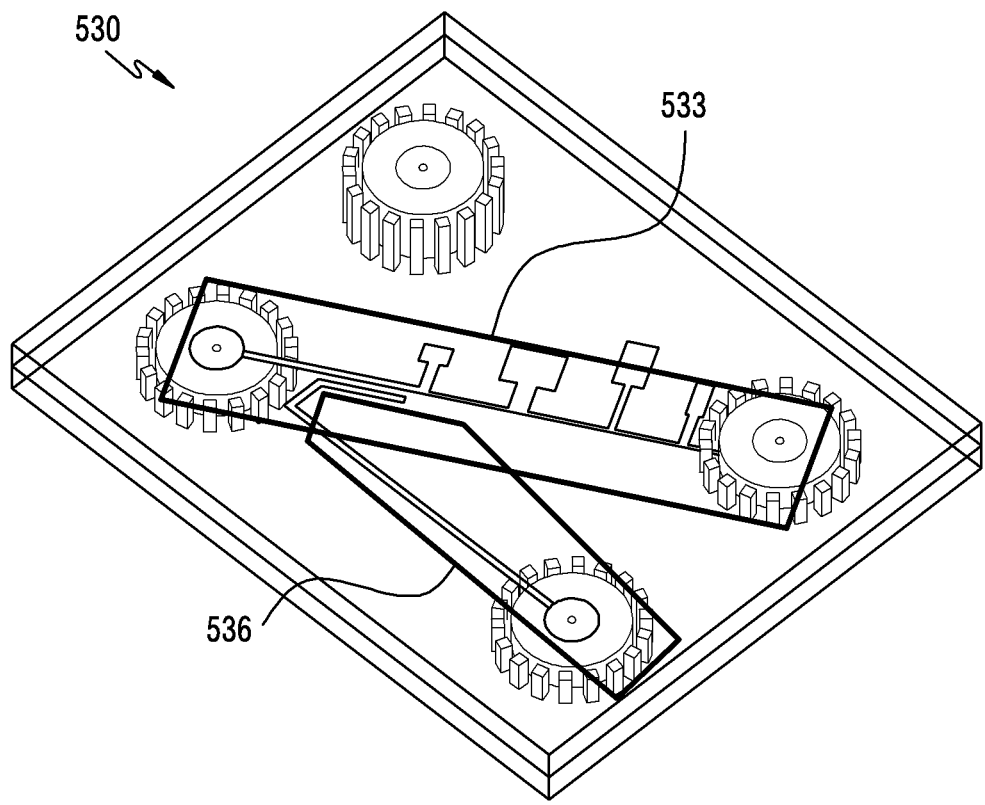

Referring to FIG. 5B, according to an embodiment of the disclosure, an LPF 533 and a coupler 536 may be disposed on a bumper PCB 530. For example, unlike the bumper PCB 510, not only the LPF but also the coupler 536 may be additionally disposed. Like the LPF 513, the LPF 533 may be a passive circuit for removing a harmonic component. The coupler (or combiner) 536 may include passive circuit for beamforming calibration of each RF path. The coupler 536 may be disposed between an input port and an output port. For example, the passive circuit may include a transmission line and a passive element. The coupler is disposed not on a filter board for arranging multiple filters, like the calibration network PCB 307 in FIG. 3 or the AFU PCB, but on one layer of a bumper PCB for functioning a cushion between the filter board and the RF filter, and thus the area of the filter board may be reduced. Although it has been described in FIG. 5B that both the LPF and the coupler are disposed on the bumper PCB 530, a structure in which the LPF is mounted on the filter board and only the coupler is disposed on the bumper PCB may also be understood as an embodiment of the disclosure.

Figure 5C:
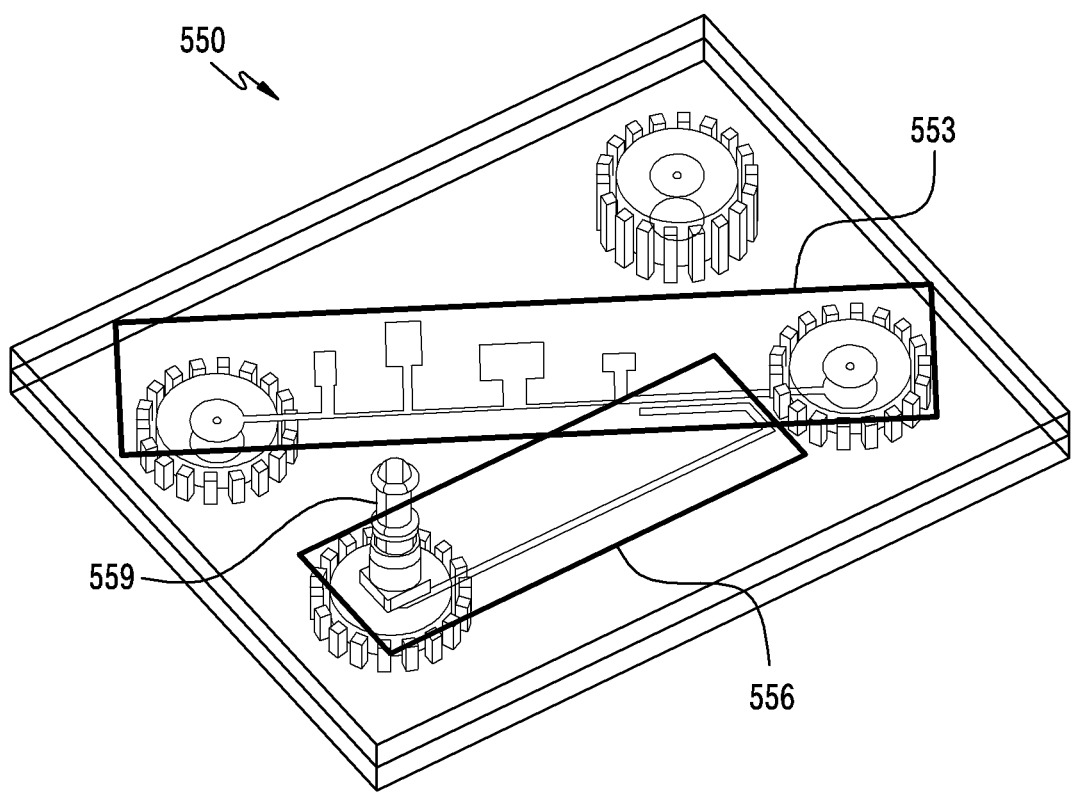

Referring to FIG. 5C, according to an embodiment of the disclosure, an LPF 553, a coupler 556, and a connector 559 may be disposed on a bumper PCB 550. For example, unlike the bumper PCB 510 and the bumper PCB 530, the connector 559 as well as the LPF and the coupler may be additionally disposed. Like the LPF 513 and the LPF 533, the LPF 553 may be a passive circuit for removing a harmonic component. The coupler (or combiner) 556 may include a passive circuit for beamforming calibration of each RF path. The connector 559 may include an RF interface. The connector 559 may include one or more RF feedlines for providing electrical connection of an RF filter via the RF interface. The connector is disposed not on a filter board for the arrangement of multiple filters, like the calibration network PCB 307 in of FIG. 3 or the AFU PCB, but on one layer of the bumper PCB for functioning a cushion between the filter board and the RF filter, and thus the area of the filter board may be reduced. According to an embodiment of the disclosure, the bumper PCB may further include an additional structure for connecting the bumper PCB to a filter board or an antenna board. The additional structure may include the connector 559.

Figure 5D:
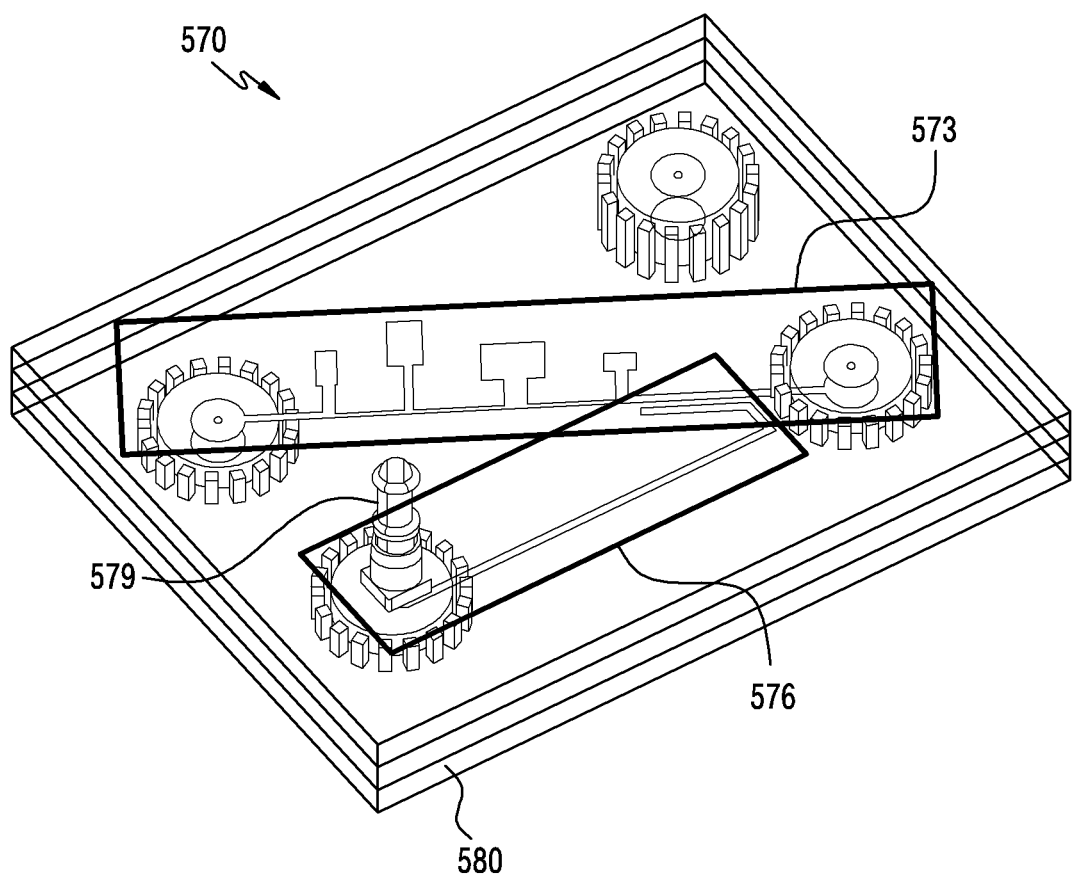

Referring to FIG. 5D, according to an embodiment of the disclosure, an LPF 573, a coupler 576, and a connector 559 may be disposed on a bumper PCB 570. FIGS. 5A to 5C illustrate a structure in which passive circuits are disposed on two layers of a bumper PCB, but embodiments of the disclosure are not limited thereto. Structures may be disposed on different layers of respective passive circuits. According to an embodiment of the disclosure, the bumper PCB 570 may include a substrate 580 including three layers. The LPF 573 may be mounted on a first layer of the bumper PCB 570. The coupler 576 may be mounted on a second layer of the bumper PCB 570. The connector 579 may be mounted on a third layer of the bumper PCB 570. Although not illustrated in FIG. 5D, it goes without saying that the arrangement of each layer of the bumper PCB may be changed or an additional layer for another passive circuit may be included in the bumper PCB.

Figure 6:
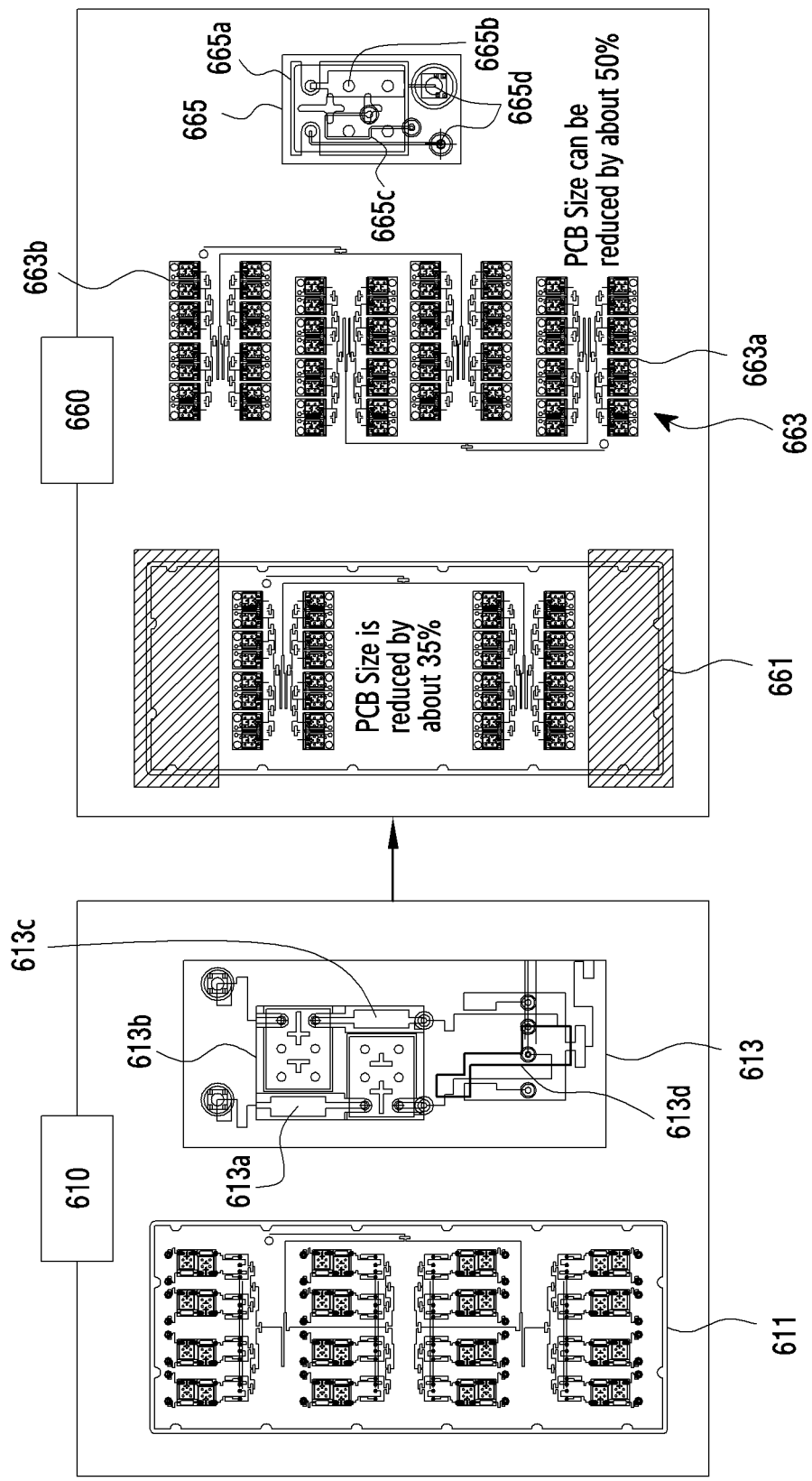
FIG. 6 illustrates an effect of reduction of an area of a filter board due to a filter module according to an embodiment of the disclosure.

FIG. 6 illustrates an effect of reduction of an area of a filter board due to a filter module according to an embodiment of the disclosure.

Referring to FIG. 6, a filter (or a filter module) for each RF path is disposed on a filter board. As RF components disposed on the surface of the filter board increase, the required area of the filter board increases. A filter board for an antenna module of 32T32R (32 transmission paths and 32 reception paths) is described as an example. Specifically, a description will be made of a structure comparison according to whether a passive circuit (e.g., an LPF, a coupler, or a connector) for processing an RF signal is disposed on a filter board or is disposed on the bumper PCB.

Referring to FIG. 6, according to an existing structure 610, a ceramic waveguide filter, a bumper PCB, and passive circuits for processing an RF signal may be disposed on one surface of a filter board 611. For example, the filter board 611 may have a size of 788 mm×316 mm. Specifically, a structure 613 for each RF path of the filter board 611 may include a ceramic waveguide filter 613a, a bumper PCB 613b, an LPF 613c, and a coupler 613d, which are disposed on a single surface.

According to a proposed structure 660, a ceramic waveguide filter and a bumper PCB are disposed on one surface of a filter board 661, and at least one of the passive circuits for processing an RF signal may be disposed on the bumper PCB. For example, the filter board 661 may have a size of 530 mm×316 mm. The area of the filter board 661 for a single antenna module of 32T32R may be reduced by about 35%. According to an embodiment of the disclosure, when two antenna modules 663a and 663b are alternately arranged in a "C" shape, the area of a filter board 663 may be reduced by about 50%. Specifically, a structure 665 for each RF path of the filter board 661 or the filter board 663 may include a ceramic waveguide filter 665a, an LPF 665b, a coupler 665c, and a connector 665d, which are arranged in a stacked form. In this case, the LPF665b, the coupler 665c, and the connector 665d may be implemented in a layer of the bumper PCB between the ceramic waveguide filter 665a and the filter board. Each of RF components may be disposed on the filter board, i.e., a calibration network PCB. Since a main passive circuit is implemented as being stacked on a ceramic waveguide filter module, the area of a filter board can be reduced. The reduction of the area of the filter board provides the reduction of the length of an RF signal processing path to the antenna element. When the length of the RF signal processing path is reduced, return loss due to impedance or feeding loss due to circuit insertion is reduced. Thus, the reduction of the area of the filter board may provide gain enhancement in RF signal processing.

Figure 7A:
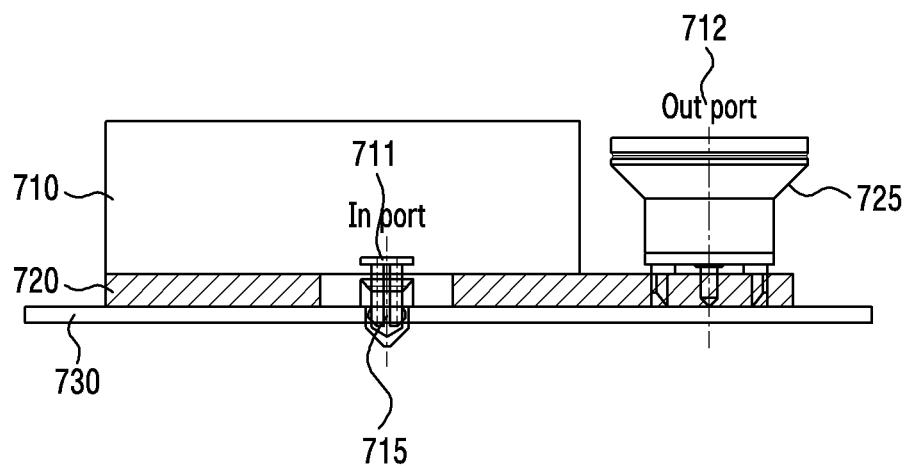
FIGS. 7A, 7B, and 7C illustrate a connection structure of a filter module and a filter board according to various embodiments of the disclosure.
Figure 7B:
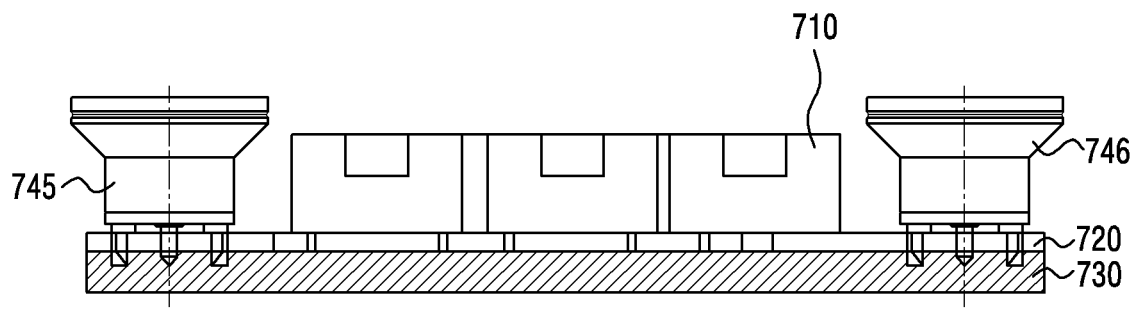
Figure 7C:
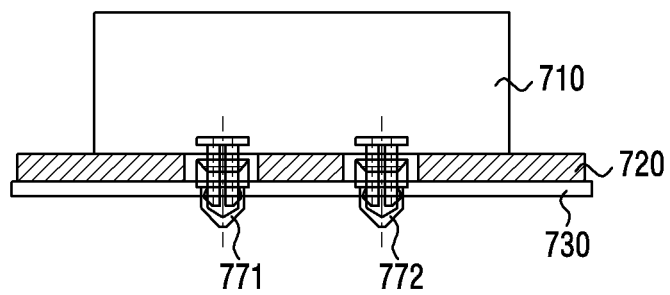

FIGS. 7A, 7B, and 7C illustrate a connection structure of a filter module and a filter board according to various embodiments of the disclosure.

Referring to FIGS. 7A, 7B, and 7C, a component for the connection structure may be referred to as a connector. The connector may include an RF interface for processing an RF signal. According to an embodiment of the disclosure, the filter board may include the calibration network PCB 307 in FIG. 3. According to another embodiment of the disclosure, the filter board may include a PCB (e.g., an AFU PCB) having one surface on which multiple filters are disposed. At least some of passive circuits for calibration may be implemented on a bumper PCB, and at least other passive circuits may be disposed at a separate position in an antenna module. A structure, in which a connector is added, and an input/output port for the structure are configured, and thus characteristic deterioration (e.g., return loss or phase) due to SMT tolerance is low, and an additional tuning process is not required. Due to this, mass production costs may be reduced.

Referring to FIG. 7A, a filter module may include an RF filter 710, a bumper PCB 720, and a filter board 730. According to an embodiment of the disclosure, the RF filter 710 may include a ceramic waveguide filter. The bumper PCB 720 may be disposed between the RF filter 710 and the filter board 730. At this time, the bumper PCB 720 may include a structure for connecting the bumper PCB 720 to the filter board 730. The bumper PCB 720 may include a connection structure for an input port 711. According to an embodiment of the disclosure, the connection structure may include a direct matching connection unit 715 for the input port 711. The direct matching connection unit 715 may include a pin-socket structure. For example, the bumper PCB 720 may include a pin-type structure. The filter board 730, which is a counterpart, may include a socket structure. Accordingly, the structure of the bumper PCB 720 may be arranged for fastening the filter module 720 to the filter board 730. For an efficient design in terms of the size and cost of the connection unit, the direct matching connection unit 715 may be included. The bumper PCB 720 may include a connection structure for an output port 712. According to an embodiment of the disclosure, the connection structure may include a blind matching connection unit 725 for the output port 712. For wide allowable tolerance when assembling each filter and RF components, the blind matching connection unit 725 may be used.

Referring to FIG. 7B, a filter module may include an RF filter 710, a bumper PCB 720, and a filter board 730. According to an embodiment of the disclosure, the RF filter 710 may include a ceramic waveguide filter. The bumper PCB 720 may be disposed between the RF filter 710 and the filter board 730. The bumper PCB 720 may include a structure for connecting the bumper PCB 720 to the filter board 730. At this time, for allowable tolerance wider than that of the connection unit illustrated in FIG. 7A, a blind matching connection unit may be used for both input and output ports. The filter module may include a first blind matching connection unit 745 and a second blind matching connection unit 746 for the input port and the output port, respectively.

Referring to FIG. 7C, a filter module may include an RF filter 710, a bumper PCB 720, and a filter board 730. According to an embodiment of the disclosure, the RF filter 710 may include a ceramic waveguide filter. The bumper PCB 720 may be disposed between the RF filter 710 and the filter board 730. The bumper PCB 720 may include a structure for connecting the bumper PCB 720 to the filter board 730. In this case, a direct matching connection unit may be used to make the filter module smaller than the filter module illustrated in FIG. 7A or 7B. The filter module may include a first direct matching connection unit 771 and a second direct matching connection unit 772 for an input port and an output port, respectively.

Figure 8:
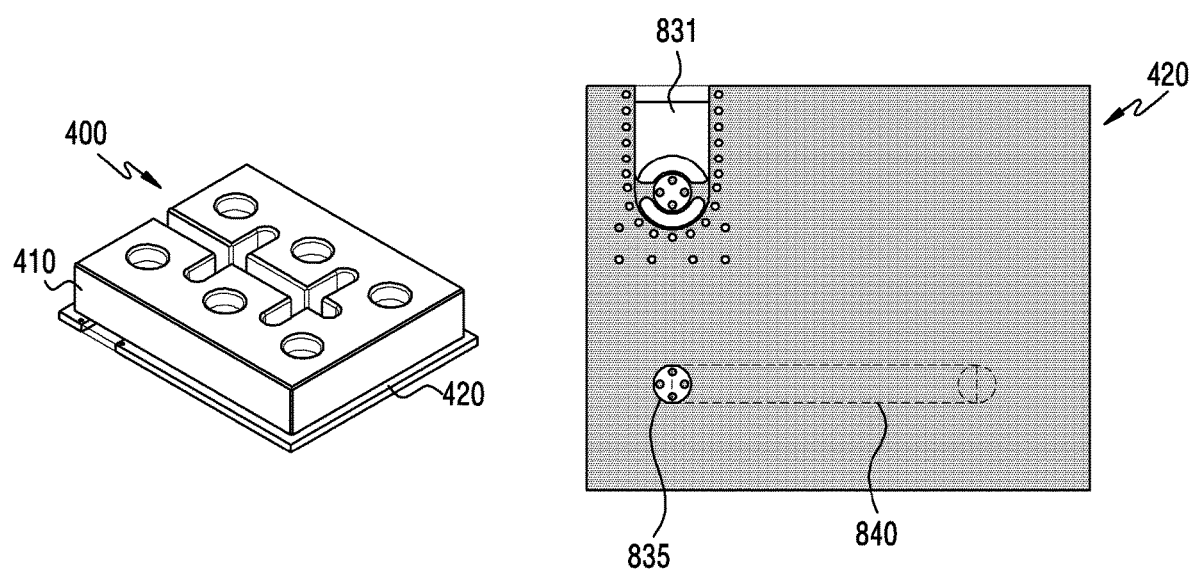
FIG. 8 illustrates a via port of a filter module according to an embodiment of the disclosure.

FIG. 8 illustrates a via port of a filter module according to an embodiment of the disclosure. The filter module 400 in FIG. 4 is illustrated as the filter module.

Referring to FIG. 8, the filter module 400 may include the RF filter 410 and the bumper PCB 420. According to an embodiment of the disclosure, the bumper PCB 420 may include a structure 831 for connecting the bumper PCB 420 to a filter board. The structure 831 shows a form in which one layer of the bumper PCBV is removed. According to an embodiment of the disclosure, the bumper PCB 420 may include a passive circuit 840. The passive circuit 840 may include at least one of an LPF, a coupler, or a connector 835. According to an embodiment of the disclosure, the bumper PCB 420 may include a via port. The via port refers to an input port or an output port formed in the form of a via. Since the port is integrally configured in the bumper PCB 420, the number of components constituting a filter module is reduced, and accordingly, the simplification of a component process may be achieved.

Figure 9:
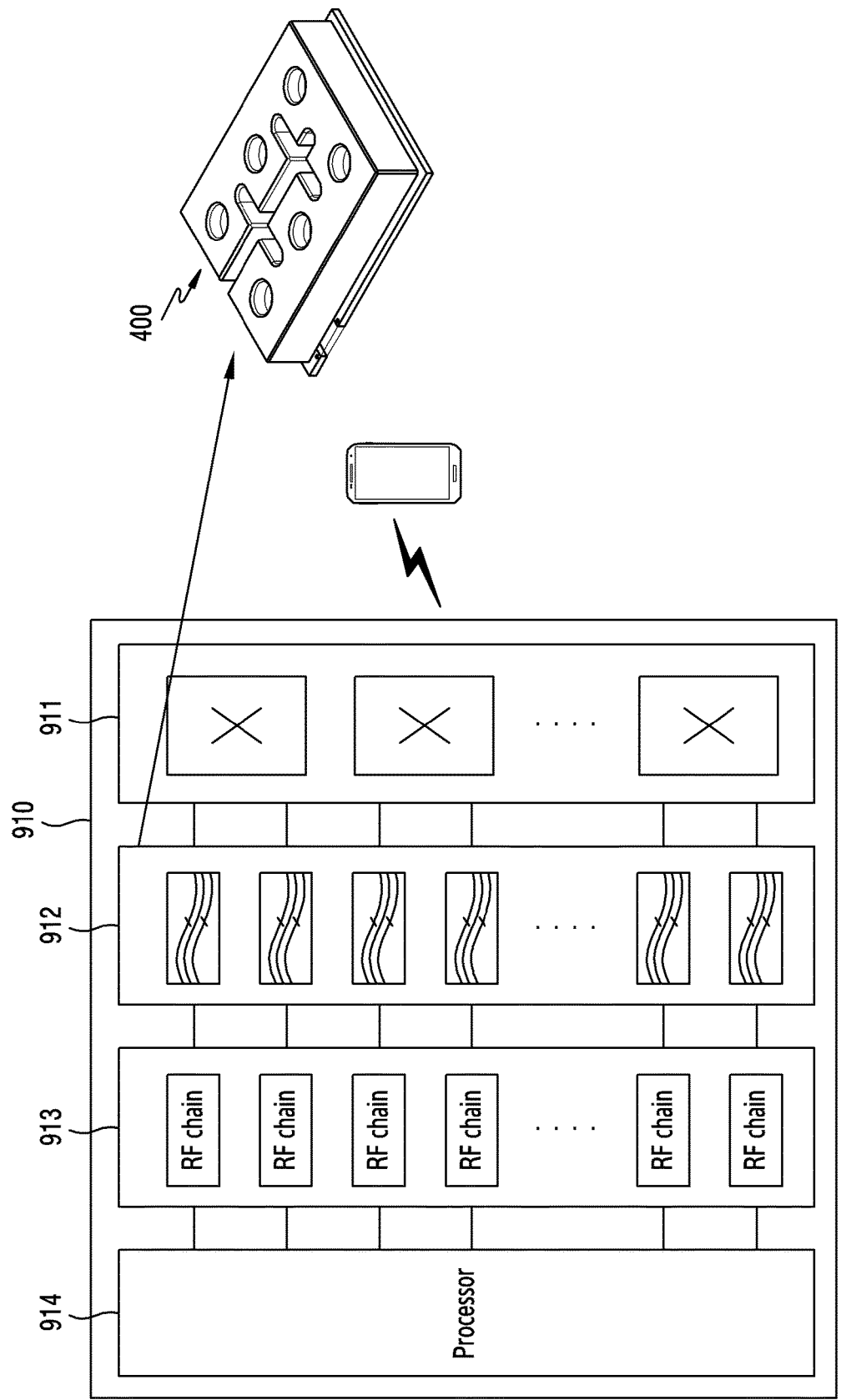
FIG. 9 illustrates functional elements of an electronic device including a filter module according to an embodiment of the disclosure.

FIG. 9 illustrates functional elements of an electronic device including a filter module according to an embodiment of the disclosure.

Referring to FIG. 9, an electronic device 910 may be one of the base station 110 or the terminal 120 in FIG. 1A. According to an embodiment of the disclosure, the electronic device 910 may be an MMU. In addition to the antenna structure itself described through FIGS. 1A, 1B, 2, 3, 4, 5A, 5B, 5C, 5D, 6, 7A, 7B, 7C, and 8, an electronic device including the same is also included in embodiments of the disclosure.

Referring to FIG. 9, functional elements of the electronic device 910 are illustrated. The electronic device 910 may include an antenna unit 911, a filter unit 912, a radio frequency (RF) processing unit 913, and a controller 914.

The antenna unit 911 may include multiple antennas. The antennas perform functions for transmitting and receiving signals through a wireless channel. The antennas may include a conductor formed on a substrate (e.g., a PCB) or a radiator formed as a conductive pattern. The antennas may radiate an upconverted signal on a wireless channel or acquire a signal radiated by another device. Each antenna may be referred to as an antenna element or antenna device. In some embodiments of the disclosure, the antenna unit 911 may include an antenna array in which multiple antenna elements are arrayed. The antenna unit 911 may be electrically connected to the filter unit 912 through RF signal lines. The antenna unit 911 may be mounted on a PCB including multiple antenna elements. The PCB may include multiple RF signal lines connecting each of antenna elements to a filter of the filter unit 912. The RF signal lines may be referred to as a feeding network. The antenna unit 911 may provide a received signal to the filter unit 912 or may radiate a signal provided from the filter unit 912 into the air.

The filter unit 912 may perform filtering to transmit a signal of a desired frequency. The filter unit 912 may form resonance to perform a function of selectively identifying a frequency. According to various embodiments of the disclosure, the filter unit 912 may include a filter module to which a filter and a bumper PCB according to various embodiments of the disclosure are coupled. The filter unit 912 may include a filter module including a cavity filter (e.g., a filter having a dielectric included in a ceramic cavity) and a bumper PCB. According to an embodiment of the disclosure, the filter module may include an LPF circuit for removing a harmonic component generated in a relatively low domain due to high permittivity. Furthermore, according to an embodiment of the disclosure, the filter module may include a passive circuit used for beamforming processing. For example, the passive circuit may include a coupler (or combiner) used for beamforming calibration. Furthermore, according to an embodiment of the disclosure, the filter module may include a connector for an RF interface between an antenna PCB and a filter board.

The filter unit 912 may include at least one of a band-pass filter, a low-pass filter, a high-pass filter, or a band-reject filter. For example, the filter unit 912 may include RF circuits for obtaining a signal of a frequency band for transmission or a frequency band for reception. The filter unit 912 according to various embodiments may electrically connect the antenna unit 911 to the RF processing unit 913.

The RF processing unit 913 may include multiple RF paths. Each of the RF paths may be a unit of a path through which a signal received through an antenna or a signal radiated through the antenna passes. At least one RF path may be referred to as an RF chain. The RF chain may include multiple RF elements. The RF elements may include an amplifier, a mixer, an oscillator, a DAC, an ADC, or the like. For example, the RF processing unit 913 may include an up-converter for up-converting a digital transmission signal of a base band to a transmission frequency, and a digital-to-analog converter (DAC) for converting the up-converted digital transmission signal to an analog RF transmission signal. The up-converter and the DAC form part of a transmission path. The transmission path may further include a power amplifier (PA) or a coupler (or a combiner). In addition, for example, the RF processing unit 913 may include an analog-to-digital converter (ADC) for converting an analog RF reception signal into a digital reception signal, and a down-converter for converting a digital reception signal to a baseband digital reception signal. The ADC and the down-converter form part of a reception path. The reception path may further include a low-noise amplifier (LNA) or a coupler (or a divider). RF components of the RF processing unit may be implemented on a PCB. The base station 910 may include a stacked structure in the order of the antenna unit 911—the filter unit 912—the RF processing unit 913. The antennas and RF components of the RF processing unit may be implemented on a PCB, and filters may be repeatedly fastened between the PCB and the PCB to form multiple layers. According to an embodiment of the disclosure, some passive circuit elements of the RF processing unit may be mounted on one layer of the bumper PCB of the filter unit 912.

The controller 914 may control overall operations of the electronic device 910. The control unit 914 may include various modules for performing communication. The controller 914 may include at least one processor, such as a modem. The controller 914 may include modules for digital signal processing. For example, the controller 914 may include a modem. When transmitting data, the controller 914 generates complex symbols by encoding and modulating a transmitted bit stream. Furthermore, for example, when receiving data, the controller 914 restores a received bit stream by demodulating and decoding a baseband signal.

The controller 914 may perform functions of a protocol stack required by the communication standard.

In FIG. 9, a description has been made of the functional elements of the electronic device 910 as a device in which the antenna structure of the disclosure may be used. However, the example illustrated in FIG. 9 is only elements for using the RF filter structure according to various embodiments of the disclosure described with reference to FIGS. 1A, 1B, 2, 3, 4, 5A, 5B, 5C, 5D, 6, 7A, 7B, 7C, and 8, and embodiments of the disclosure are not limited to the elements of the device illustrated in FIG. 9. Accordingly, an antenna module including the antenna structure, a communication device having a different configuration, and the antenna structure itself may also be understood as embodiments of the disclosure.

According to an embodiment of the disclosure, a sub-PCB functioning as a bumper may include an RF component included in the RF processing unit (e.g., an element capable of being disposed in one RF processing chain). The RF component may be associated with an antenna element. When transmitting a signal, if the length of a transmission line increases, impedance increases, which affects return loss. In addition, as illustrated in FIG. 3, since the antenna modules are arranged in a stacked structure, performance degradation may be caused by loss due to the length of a feed line whenever the feed line passes through the layers. In order to minimize performance degradation (e.g., a change in characteristic impedance or insertion loss due to power supply), an RF component that is closely related to an antenna element needs to be disposed closer to the antenna element. For example, in an antenna module having a stacked structure, a performance effect may be increased by arranging an RF component on a sub-PCB of a filter. The sub-PCB may increase an antenna gain by providing a bumper function while minimizing loss degradation.

A filter module according to various embodiments of the disclosure may include a bumper PCB and an RF filter. The filter module may be disposed on a filter board. According to an embodiment of the disclosure, the filter board may include a calibration network PCB. Also, according to an embodiment of the disclosure, the filter board may include an antenna filter unit (AFU) PCB. The bumper PCB may include at least one of a coupler, a divider, a connector, and an LPF that are of the related art implemented on a filter board. According to an embodiment of the disclosure, the bumper PCB may have a multi-layer structure. At least one passive circuit may be implemented in each layer of the bumper PCB, thereby reducing the size of the filter board. In addition, the bumper PCB is disposed between the filter board and the RF filter, and thus SMT performance degradation may be prevented. By implementing the bumper PCB, a crack may be prevented during SMT with a ceramic filter, and the area of the filter board may be reduced (about 50%). In other words, according to various embodiments of the disclosure, the filter module may include a structure in which the size of a main PCB may be reduced by using a bumper PCB having a stacked structure. As described with reference to FIG. 6, unit cost may be reduced by the reduction of the area of the PCB size. Due to the arrangement of the bumper PCB, when assembling the filter module and the filter board, characteristic deterioration due to a change in a phase component or return loss is relatively low. In addition, a separate tuning process is not required when manufacturing the filter board, and thus unit cost may be reduced.

According to embodiments of the disclosure, an antenna filter module may include a filter configured to filter a radio frequency (RF) signal, and a sub-printed circuit board (PCB), wherein the sub-PCB includes a passive circuit configured to process the RF signal, and the sub-PCB is coupled to the filter so as to operate as a bumper when the filter is coupled to a filter board.

According to an embodiment of the disclosure, in the filter module, the filter may be a ceramic waveguide filter.

According to an embodiment of the disclosure, the passive circuit may include a low-pass filter (LPF).

According to an embodiment of the disclosure, the passive circuit may include a coupler for beamforming of the RF signal.

According to an embodiment of the disclosure, the passive circuit may include a connector for an RF interface.

According to an embodiment of the disclosure, the sub-PCB may be formed to have multiple layers, and the passive circuit may include at least one of a low-pass filter (LPF), a connector, and a coupler.

According to an embodiment of the disclosure, the LPF may be mounted on a first layer of the multiple layers, and the connector may be mounted on a second layer of the multiple layers.

According to an embodiment of the disclosure, the sub-PCB may include a structure for a port formed as a via.

According to an embodiment of the disclosure, the sub-PCB may include a groove structure for a direct matching connection unit or a blind matching connection unit.

According to an embodiment of the disclosure, the filter board may include a calibration network PCB for beamforming processing of the RF signal.

According to embodiments of the disclosure, a massive multiple-input multiple-output (massive MIMO) unit (MMU) device in a wireless communication system may include at least one processor configured to process a signal; multiple radio frequency (RF) filter modules configured to filter a signal, and an antenna array configured to radiate a signal, wherein an RF filter module among the multiple RF filter modules includes a filter configured to filter an RF signal, and a sub-printed circuit board (PCB) coupled to the filter, the sub-PCB includes a passive circuit configured to process the RF signal, and the sub-PCB is coupled to the filter so as to operate as a bumper when the filter is coupled to a filter board.

According to an embodiment of the disclosure, the filter may be a ceramic waveguide filter.

According to an embodiment of the disclosure, the passive circuit may include a low-pass filter (LPF).

According to an embodiment of the disclosure, the passive circuit may include a coupler for beamforming the RF signal.

According to an embodiment of the disclosure, the passive circuit may include a connector for an RF interface.

According to an embodiment of the disclosure, the sub-PCB may be formed among multiple layers, and the passive circuit may include at least one of a low-pass filter (LPF), a connector, and a coupler.

According to an embodiment of the disclosure, the LPF may be mounted on a first layer of the multiple layers, and the connector may be mounted on a second layer of the multiple layers.

According to an embodiment of the disclosure, the sub-PCB may include a structure for a port formed as a via.

According to an embodiment of the disclosure, the sub-PCB may include a groove structure for a direct matching connection unit or a blind matching connection unit.

According to an embodiment of the disclosure, the filter board may include a calibration network PCB for beamforming processing of the RF signal.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna module comprising:
    at least one antenna array including a plurality of antenna elements;
    at least one radio frequency (RF) chip;
    a board including a plurality of RF components for a plurality of RF paths;
    a plurality of ceramic waveguide filters, each of the plurality of ceramic waveguide filters being disposed in a RF path of the plurality of RF paths; and
    a plurality of sub-boards functioning as a bumper, each of the plurality of the sub-boards being coupled to a corresponding ceramic waveguide filter,
    wherein the each of the plurality of the sub-boards includes, for the corresponding ceramic waveguide filter, an input port and an output port formed of a via, and a low-pass filter (LPF) for filtering an RF signal applied to the input port, and
    wherein the plurality of sub-boards are disposed between the plurality of ceramic waveguide filters and the board.

2. The antenna module of claim 1,
    wherein the board includes at least one RF component for a beamforming calibration; and
    wherein each of the plurality of the sub-boards includes a coupler for beamforming calibration.

3. The antenna module of claim 2, wherein each of the plurality of the sub-boards includes a connector for an RF interface.

4. The antenna module of claim 3,
    wherein each of the plurality of the sub-boards includes multiple layers.

5. The antenna module of claim 4,
    wherein the LPF is mounted on a first layer of the multiple layers,
    wherein the coupler is mounted on a second layer of the multiple layers, and
    wherein the connector is mounted on a third layer of the multiple layers.

6. The antenna module of claim 1, wherein each of the plurality of the sub-boards includes a groove structure for a direct matching connection unit or a blind matching connection unit.

* * * * *